Oct. 17, 1967    J. J. QUACKENBUSH ET AL    3,347,443
CONTAINER CLOSURE
Filed Jan. 3, 1966
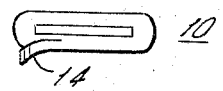
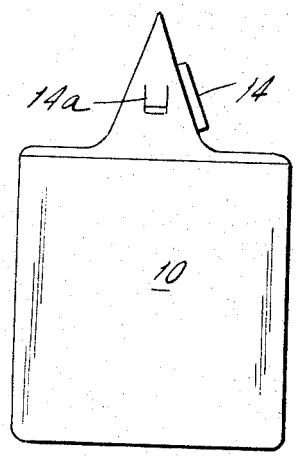
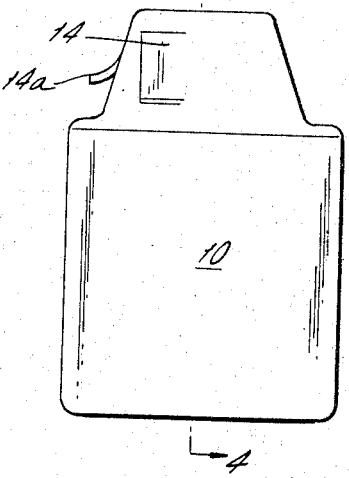
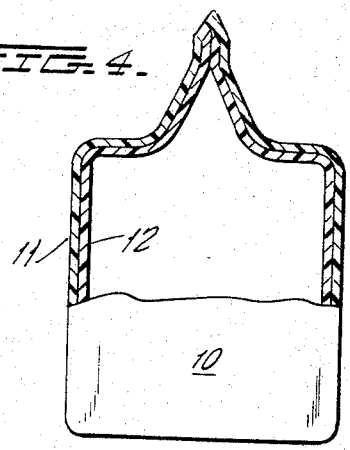
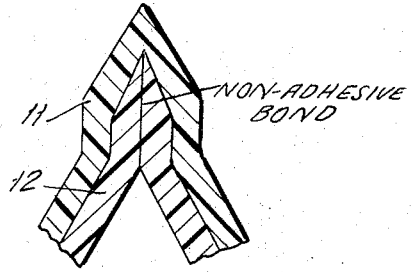
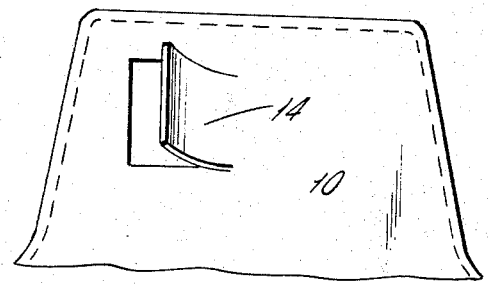
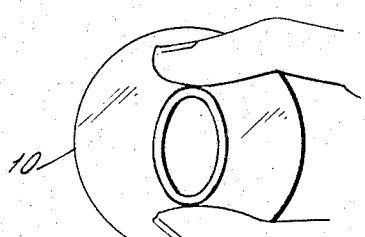
INVENTOR.
JOHN J. QUACKENBUSH
HERBERT O. CORBETT
BY United States Patent Office 3,347,443
Patented Oct. 17, 1967

3,347,443
CONTAINER CLOSURE
John Joseph Quackenbush, Monroe, and Herbert Oliver Corbett, Bridgeport, Conn., assignors to National Distillers and Chemical Corporation, New York, N.Y., a corporation of Virginia
Filed Jan. 3, 1966, Ser. No. 518,085
5 Claims. (Cl. 229—14)

ABSTRACT OF THE DISCLOSURE

A plastic container formed of laminated plastic material has a sealed closure formed by the sealing of the outer layer which is of material which is easily sealed to itself, and which can be peeled away from an interior layer which is bifurcated to seal to itself, and diffuse an opening for the container.

---

This invention relates to a container closure, and more specifically relates to a closure which is normally hermetically sealed and is opened in an easy and simplified manner to expose the interior of the container for use.

There are many well known applications for containers which must normally be hermetically sealed until use of the containers is required.

The principle of the present invention is to form a novel plastic container which has a normally sealed closure therein which can be easily exposed by removing the outer plastic layer of a laminate plastic forming at least the closure portion of the container. More particularly, the extrusion of plastic containers formed of multilaminate walls is well known, and is described, for example, in copending application Ser. No. 350,220, filed Mar. 9, 1964, in the name of Corbett, entitled Laminated Products and Methods and Apparatus for Producing Same, and assigned to the assignee of the present invention. In this type arrangement, several plastic layers are forced into a suitable mold so that, for example, the exterior and interior of the container will be composed of different plastics having their own particular characteristics best adapted for use on the interior and exterior of the container.

In accordance with the invention, the extruded container is so arranged that its interior layer is composed of a material characterized in not sealing to itself, whereas the exterior layer can be sealed to itself either during the extrusion process or during a secondary sealing process after the container is filled.

Moreover, the interior and exterior layer materials are selected to be those which do not have a large degree of adhesion to one another so that they can be readily peeled apart.

In forming the container in this manner, the normally open end of the container can be left open so that the container can be subsequently filled. After the container is filled, the upper end of the container is pinched closed in a normal plastic sealing apparatus where, however, since the interior layers are of a material characterized in not easily adhering to one another, these interior layers will not adhere. The exterior layers of the container, however, will adhere to one another, thereby serving to form a hermetic sealing skin over the unsealed interior layer.

A suitable peel strip may then be provided in any desired manner, removed from the area of closure, whereby the peel strip can serve to peel the outer layer from the inner layer (the two not adhering to one another in a substantial manner), thereby to expose the unsealed closure of the inner layers. This can then be opened to provide access to the interior of the container which was previously hermetically sealed.

Note that the arrangement of the invention can further serve in the formation of normally sealed and sterilized structures where the sterile inner layer is exposed only when access thereto is desired by peeling the outer layer away from the inner layer. Moreover, the novel arrangement is easily applicable to removable cap arrangements or "throw-away" cap arrangements for bottles such as the nipples of a nursing bottle which are normally covered by the outer peelable layer.

Accordingly, a primary object of this invention is to provide a novel closure arrangement formed of a multi-laminated plastic material.

Yet another object of this invention is to provide a novel plastic closure which is normally hermetically sealed.

These and other objects of this invention will become apparent from the following description when taken in connection with the drawings, in which:

FIGURE 1 is a side plan view of a bottle container formed in accordance with the present invention.

FIGURE 2 is a top view of FIGURE 1.

FIGURE 3 is a side view of FIGURE 1.

FIGURE 4 is a partial cross-sectional view of FIGURE 3 taken cross the line 4—4 in FIGURE 3.

FIGURE 5 is an enlarged cross-sectional view of the seal formed in FIGURE 4.

FIGURE 6 is an enlarged side view of FIGURE 5 to better illustrate the tear strip.

FIGURE 7 illustrates the opening which is formed in the top of the bottle after the tear strip is removed to expose the interior plastic laminate.

Referring first to FIGURES 1 through 4, there is illustrated therein a container 10 which may be of any desired configuration for any desired containing use such as food, or the like. The container 10, in accordance with the invention, is formed of a laminated plastic wall structure which includes an outer layer 11 and an interior layer 12. The materials for layers 11 and 12 are so selected that the interior layer will not easily adhere to itself under the influence of heat sealing, while the outer layer will adhere to itself under the influence of heat sealing. Moreover, the materials are further selected such that the outer and inner layers do not substantially adhere to one another.

For purposes of illustration, the interior layer 12 can be formed of a polyvinyl chloride material or an extrudable nylon or polyvinylidene chloride (Saran), while the exterior layer 11 may be of polyethylene or any of the other polyolefins which can be readily heat sealed.

The container 10 of FIGURES 1 through 4 is then extruded in any desired manner to the form of an open ended pipe having an inwardly tapered upper section. The upper section is normally open to permit the filling of the container. After filling, a heat sealer, which may be of any desired type and could, for example, be a pair of heated bars which are applied to the upper end of the container, applies heat and pressure to the opposing upper edges of the container, thereby to close the container, as shown in FIGURES 4 and 5. That is to say, the sealing apparatus will pinch the upper end of the container together with the outer polyethylene layer 11 flowing sufficiently to bridge across the top of the non-adhering interior polyvinyl chloride layer 12.

FIGURE 5 illustrates this polyethylene bridge as the bridge 13 with the non-adhesive bond being formed between the opposing walls of interior layer 12. Note that this will complete the closure of the container so that the contents of the container will be hermetically sealed.

Thereafter, and as shown in FIGURE 6, a tear strip 14 is formed in the outer layer 11 of the container, removed, however, from the bridge region 13. If desired, the suitable gouge lines extending from tab 14 can be applied to outer layer 11 to guide the tear strip action. Alternatively, the tear strip could be arranged as shown by tab 14a in FIGURES 1 and 3 where the tear would remove just the top portion of the bridge across the non-adhering junction of the interior polyvinyl layer 12.

If now the tear strip 14 is pulled, it will be understood that the tear strip 14 will cause the separation of the upper portions of layer 11 from layer 12 so that the upper cap portion of layer 11 can be removed from the container. This will then expose the non-adhesive bond, shown in FIGURE 5, between the interior surfaces of layer 12, whereby these interior walls can be spread, as illustrated in FIGURE 6, to provide access to the interior of the container.

It will be apparent that the novel concept of the invention can be applied to many types of bottle configurations, and that various types of plastic materials can be used for the layers 11 and 12 to form an outer sealing layer and an inner non-sealing layer.

Moreover, it will be apparent that the invention is generally applicable in the closure field, and need not be applied to a complete container, but could, for example, be applied to a removable container closure.

In the selection of the various plastics, it will be obvious that consideration must be given to expense (since the container will preferably be of the throw-away variety), its thermal characteristics (since the container may often be used for the direct heating of the contents as with conventional nursing bottle warming apparatus), and the like.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A plastic container closure comprising a laminated plastic having an inner layer and an outer layer; the material of said inner layer characterized in having poor self-sealing characteristics under heat sealing; the material of said outer layer characterized in having good self-sealing characteristics under a heat seal extending across an end portion of said container closure sealing said outer layer at said heat seal; said inner layer adjacent said heat sealed portion being collapsed upon itself without sealing under said sealed outer layer whereby said sealed outer layer hermetically seals across said collapsed and unsealed inner layer.

2. The closure as set forth in claim 1 wherein said materials of said inner and outer layer are further characterized in poorly adhering to one another.

3. The closure as set forth in claim 2 which further includes a tear tab extending from said outer layer removed from the area of said heat seal.

4. The closure as set forth in claim 1 wherein said outer layer is a polyolefin and said inner layer is a material having the adhesion characteristics of a polyvinyl chloride.

5. A blown plastic container having a closure end; said blown plastic container comprised of a laminated plastic body having an inner layer and an outer layer; the material of said inner layer characterized in having poor self-sealing characteristics under heat sealing; the material of said outer layer characterized in having good self-sealing characteristics under heat sealing; a heat seal extending across an end portion of said container closure sealing said outer layer at said heat seal; said inner layer adjacent said heat sealed portion being collapsed upon itself without sealing under said sealed outer layer whereby said sealed outer layer hermetically seals across said collapsed and unsealed inner layer.

References Cited
UNITED STATES PATENTS

| | | | |
|---|---|---|---|
| 2,297,375 | 9/1942 | Vogt. | |
| 2,409,998 | 10/1946 | Waters | 229—55 |
| 2,510,727 | 6/1950 | Sussenbach. | |
| 2,689,079 | 9/1954 | Timer | 229—55 X |
| 2,719,100 | 9/1955 | Banigan. | |
| 3,017,302 | 1/1962 | Hultkrans. | |
| 3,078,201 | 2/1963 | Christie. | |
| 3,190,788 | 6/1965 | Loos | 161—406 |
| 3,298,597 | 2/1967 | Bellamy | 229—55 |

JOSEPH R. LECLAIR, *Primary Examiner.*

DAVIS T. MOORHEAD, *Examiner.*